United States Patent [19]

Ferrigan et al.

[11] Patent Number: 5,221,066
[45] Date of Patent: Jun. 22, 1993

[54] COLLAPSIBLE RACK FOR AUTOMOTIVE BODY PANEL

[76] Inventors: Paul J. Ferrigan, 113 Timber La., Saratoga; Richard F. McRay, 206 Regent St., Saratoga Springs, both of N.Y. 12866

[21] Appl. No.: 801,434

[22] Filed: Dec. 2, 1991

[51] Int. Cl.5 .......................................... F16M 11/38
[52] U.S. Cl. ................................. 248/166; 280/646; 280/35; D34/17
[58] Field of Search ............... 280/35, 39, 79.11, 646; 248/166, 129, 150; D34/17, 23, 24; 211/195

[56] References Cited

U.S. PATENT DOCUMENTS

| D. 288,739 | 3/1987 | Johnson, Jr. et al. ........... D34/17 |
| D. 304,118 | 10/1989 | Snoke et al. .................... D34/17 X |
| 1,955,463 | 4/1934 | Lathrop ............................. 280/35 |
| 2,675,981 | 4/1954 | Ferris ............................ 211/195 X |
| 2,716,557 | 8/1955 | Gould et al. |
| 2,890,060 | 6/1959 | Ott et al. ....................... 280/641 X |
| 3,197,226 | 7/1965 | Erlinder ......................... 280/655 X |
| 4,159,110 | 6/1979 | Dodenhoff ........................ 280/42 |
| 4,830,386 | 5/1989 | Snoke et al. ....................... 280/38 |
| 5,037,117 | 8/1991 | Hershberger .................... 280/641 X |

FOREIGN PATENT DOCUMENTS 806651 12/1958 United Kingdom .

*Primary Examiner*—Alvin C. Chin-Shue
*Assistant Examiner*—Korie H. Chan
*Attorney, Agent, or Firm*—McCormick, Paulding & Huber

[57] ABSTRACT

A roof rack for storing a removable roof or body panel when not on the automobile. Two L-shaped legs are mounted in sockets provided in a central column that swings from an inverted position where the legs are stowed alongside the column to deployed positions that support the column in an upright position. A pivoted pad on the column cooperates with abutments at the lower ends of the L-shaped legs to support the roof or other automotive body panel.

9 Claims, 2 Drawing Sheets

COLLAPSIBLE RACK FOR AUTOMOTIVE BODY PANEL

This invention relates generally to racks for supporting an automotive body panel such as a hard top roof, and deals more particularly with a collapsible rack for use by the owner of the vehicle in order to store the relatively bulky hard top of his automobile.

SUMMARY OF THE INVENTION

In accordance with the present invention a collapsible rack is provided for supporting an automotive body panel such as a hard top roof. The rack includes a generally vertically oriented column supporting two L-shaped members such that each L-shaped member has a lower leg and a generally perpendicular upper leg. The upper leg has an end portion rotatably supported at one end of the column in sockets defined in opposite sides of the column adjacent the one end. The lower legs have end portions defining abutments for supporting a lower edge of the automotive body panel. The column has an opposite end on which a pivotal pad is provided that the pad further supports the automotive body panel. The rack can be manipulated into a stowed condition such that the L-shaped members have their upper legs provided alongside the column, and such that the column can be inverted from its deployed position to a stored condition alongside these upper legs.

DETAILED DESCRIPTION

Figure 1:
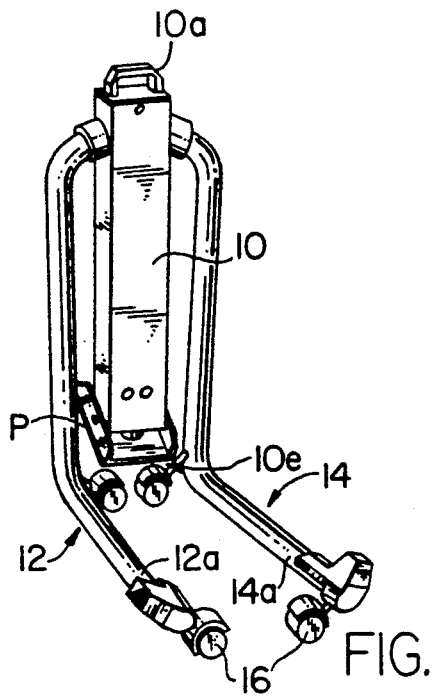
FIG. 1 is a perspective view of the collapsible rack provided in a stowed condition.
Figure 2:
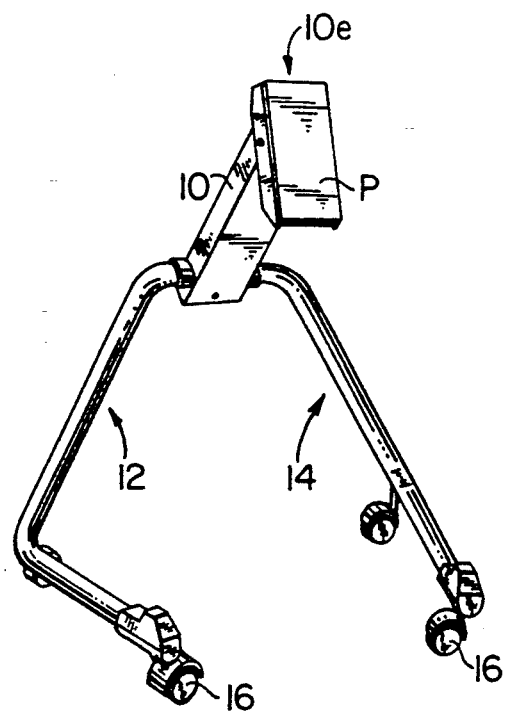
FIG. 2 is a view of the rack in a position intermediate the stowed position and a deployed position.
Figure 3:
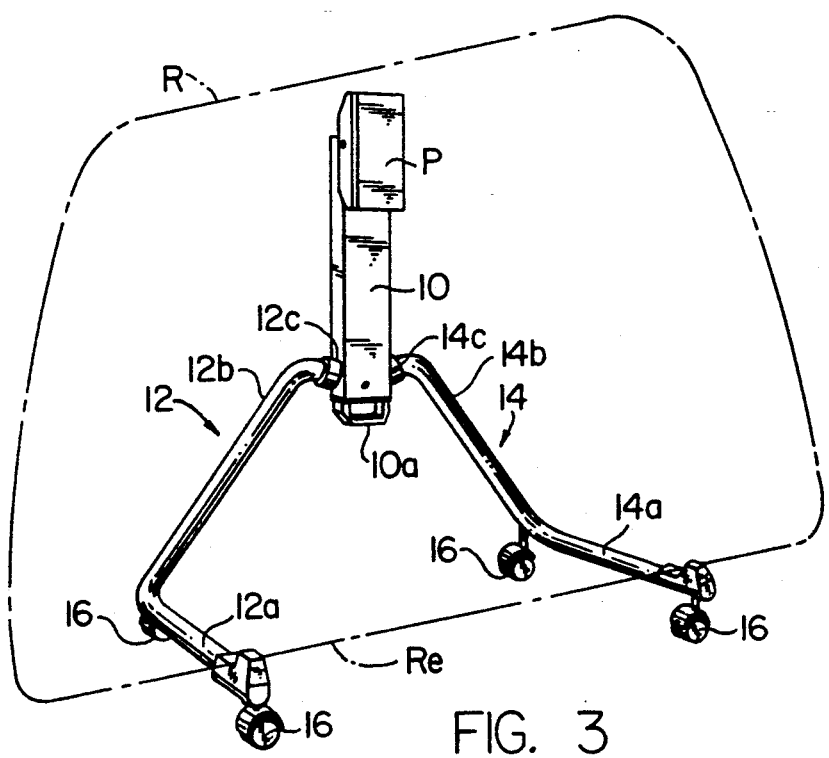
FIG. 3 is a perspective view of the rack in the its deployed position.

Turning now to the drawings in greater detail, FIGS. 1, 2 and 3 illustrate a rack constructed in accordance with the present invention, which rack is adapted to support an automotive body part or panel when deployed to the position shown in FIG. 3. As shown in this view the body panel, as for example a hard top roof, would be supported with one edge (Re) resting against abutments provided for this purpose on the extremity of the leg members, and with another portion of the roof panel supported on a pivoted pad (P) provided at the uppermost end of the column 10. The column 10 is itself supported at the upper end of these L-shaped leg members.

The leg members 12 and 14 are generally L-shaped and have lower legs located in parallel relationship to one another at least in their deployed condition where they are also parallel to the floor upon which the rack rests. These lower legs of the members 12 and 14 carry casters, as indicated generally at 16 in the drawings. These casters are of conventional construction and are adapted to be fitted into sockets provided for this purpose in the underside of the lower legs of the members 12 and 14.

Still with reference to the members 12 and 14 each such member also includes said upper leg portion, oriented at right angles to the lower leg, and which upper leg has an upper end portion as suggested at 12c and 14c which is angled so as to be received in angled sockets provided for this purpose in the opposite sides of the column 10 adjacent one end 10a of the column.

At the column end 10a a handle is provided for conveniently maneuvering the rack in its stored condition as best shown in FIG. 1. The casters 16, 16 also function in this deployed condition so as to facilitate maneuvering the stowed rack for storage or the like.

Figure 4:
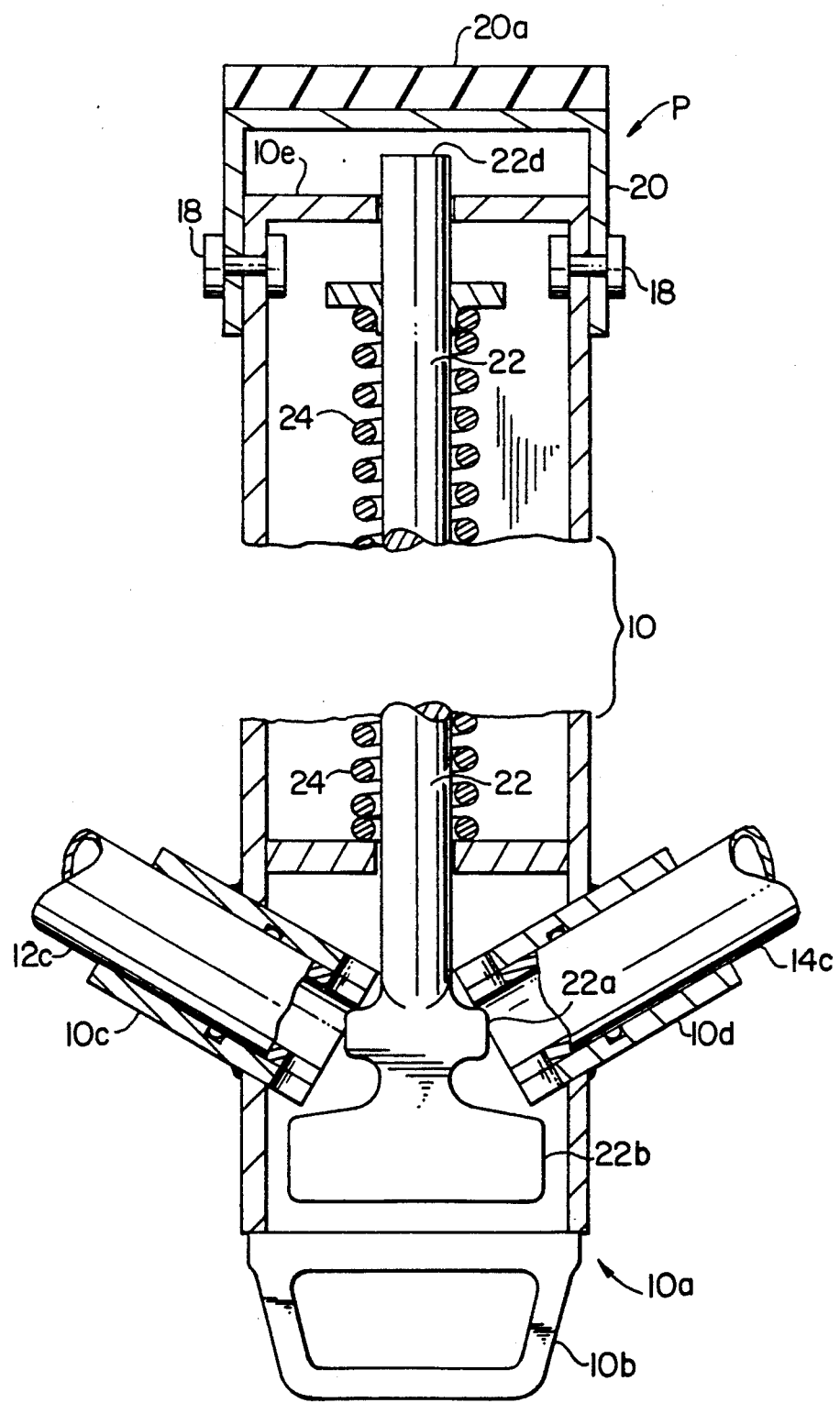
FIG. 4 is a vertical section taken through the end of the column associated with the sockets for pivotably supporting the upper end portions of the L-shaped leg members.

As best shown in FIG. 4 the column 10 comprises a generally rectangular tubular member with one end 10a being fitted with a handle 10b and with an opposite end pivotably supporting the pad P. As indicated at 18, 18 in FIG. 4 one or more pivot pins in the form of a single bolt or two such bolts provided in the opposite end of column 10 for pivotably supporting the pad P. The pad P comprises a generally channel shaped member 20 with side flanges that are pivotably supported on the opposite sides of the column 10. The web of the channel shaped pad P has an elastomeric pad 20a secured to it as shown for preventing any damage to the roof panel R that is stored on the rack.

Still with reference to FIG. 4 an elongated plunger 22 is slidably received in the column 10 and is adapted to be depressed from a normal position, where the end of plunger 22 extends beyond the end of the column 10, to a depressed condition, such as that shown where the plunger is depressed so that an end opposite the projecting end portion is adapted to releasably engage the upper end portions of the tubular legs 12c and 14c. More specifically, the ends of the tubular legs 12c and 14c are slotted so as to be engaged by protuberances 22a and 22b on the end of the plunger 22 opposite the projecting end portion referred to previously. As shown, the projecting portions 22a and 22b are not received in these slots, but when the plunger moves from the position shown to its normal position, by action of biasing means in the form of the coil compression spring 24, these abutments 22a and 22b engage these slots in the ends of the tubular legs 12c and 14c to secure the legs in both the stowed and the deployed positions.

In conclusion, the column 10 and the L-shaped members 12 and 14 can be locked in opposed limit positions corresponding to the stowed and the deployed positions illustrated for these legs in FIGS. 1 and 3.

It is a feature of the present invention that the end portion 22d of the plunger 22 which projects beyond the one end of the column 10 can be engaged by the pivoted pad P so as to depress the plunger 22 to the position shown in FIG. 4. As mentioned previously, the compression spring 24 will return the plunger 22 from the position shown in FIG. 4 to a locking position in order to releasably secure the leg members 12 and 14 in their stowed and their deployed positions.

The L-shaped leg members 12 and 14 are free to swivel in their sockets regardless of the position of the plunger 22 in positions intermediate these limit positions. Preferably, the sockets or bearings for pivotably supporting the upper ends of the leg members 12 and 14 are defined by short tubular elements 10c and 10d welded into the side walls of the tubular column 10 as best shown in the lower part of FIG. 4. Each leg has a spring loaded ball to releasably retain the leg in its socket. The tubular sockets have annular grooves for receiving said balls.

Turning now to the operational aspects of the present invention, FIG. 1 shows the collapsible rack as it would be taken from the carton when shipped to the customer or when opened by the customer in his garage for example. The handle 10a on one end of the column 10 provides a convenient means for transporting the unit, the casters 16, 16 at the four corners of the parallelogram define by the lower leg members 12a and 14a permit the rack to be manipulated into a convenient position for storage even when these legs are stowed.

As illustrated in FIG. 2, and as suggested in FIG. 1, the opposite end 10e of the column 10 can be swung upwardly from the position shown in FIG. 1 to that in FIG. 2 by releasing the locking member at this opposite end 10e. This locking member can be released by pressing the plunger 22 either directly by swinging the pad P out of the way, or by swinging the pad P around its pivot mount so as to engage the upper end 22d of the plunger with the underside of the channel shaped pad member as described previously.

The column 10 is swung from the position illustrated in FIG. 1 (that is in the depending vertical position) to an upright vertical position as suggested in FIG. 3. At the same time, the legs 12 and 14 will be moved from their deployed positions as illustrated in FIG. 1 through the FIG. 2 positions for the legs 12 and 14 until they reach positions where they form a firm base for the unit as shown in FIG. 3. As the column 10 reaches the upright vertical position the plunger will be spring biased back to a locked position so as to secure the members in their deployed condition. The pad P is free to pivot relative to the end of the column 10 so as to accommodate the automobile roof panel, indicated generally at R in broken lines, to store the panel in the automobile owner's garage or other convenient storage area. The lower edge (Re) of the panel R rests on the elastomeric abutments provided for this purpose at the end of the lower leg elements described previously. The elastomeric pad P provides a third area of support for the panel. This device can accommodate panels of somewhat different configuration as a result of the fact that the pad P pivots and as a result of the fact that only three support points are provided for the automotive body part or panel to be stored.

We claim:

1. A collapsible rack for supporting an automotive body panel such as a hard top roof, said rack comprising; two L-shaped members, each L-shaped member having a lower leg which extends along a longitudinal axis thereof and an upper leg oriented at approximately right angles to said lower leg, each upper leg having an end portion, a central column having one end, said column having opposed sides, sockets defined in said opposite sides of said column adjacent said one end, said upper leg end portions rotatably supported in said sockets in such a way as to allow the column to freely rotate about the upper leg end portions, and means for releasably securing each said L-shaped member relative to said column in a deployed position such that the L-shaped members have said longitudinal axis of said lower legs arranged in widely spaced parallel relation to one another in a horizontal plane, and wherein said column extends generally vertically upwardly in a plane that also includes said upper legs of said L-shaped members, and in a storage position such that the upper leg end portions extend parallel with and in the same plane as said column.

2. The rack according to claim 1 wherein said lower legs have end portions defining abutments for supporting a lower edge of the automotive body panel, and wherein said column has an opposite end arranged opposite said one end, a pad provided on said opposite end of said column for further supporting said automotive body panel.

3. The rack according to claim 2 wherein said opposite end of said column pivotably supports said pad.

4. The rack according to claim 1 wherein said means for releasably securing each of said L-shaped member in said deployed position comprises a locking member slidably supported in said column, and said upper leg end portions having slots for receiving said locking member at least when said L-shaped members are in said deployed positions.

5. The rack according to claim 4 wherein said locking member is also received in said slots to secure said L-shaped members in stowed positions, said stowed positions providing said upper legs of said L-shaped members alongside said opposed column sides in said stowed positions, said upper legs arranged adjacent said opposed sides in said stowed position.

6. The rack according to claim 5 wherein said means for releasably securing said L-shaped members further comprises a slidable plunger having a projecting end adjacent said one end of said column, and means coupling said plunger to said locking member.

7. The rack according to claim 6 wherein said plunger projecting end is so located relative to said pivotably supported pad that said pad can be used to depress said plunger and thereby release said locking member.

8. The rack according to claim 7 wherein said means coupling said plunger to said locking member further comprises biasing means urging said plunger away from said depressed position toward a plunger projecting position.

9. The rack according to claim 8 further including casters provided on said lower legs of said L-shaped members to permit the rack and the automotive body part to be moved manually from one position to another.

* * * * *